United States Patent [19]

Butt et al.

[11] Patent Number: 4,547,649

[45] Date of Patent: Oct. 15, 1985

[54] METHOD FOR SUPERFICIAL MARKING OF ZIRCONIUM AND CERTAIN OTHER METALS

[75] Inventors: Donald B. Butt, Lynchburg; William C. Young, Roanoke, both of Va.

[73] Assignee: The Babcock & Wilcox Company, New Orleans, La.

[21] Appl. No.: 472,319

[22] Filed: Mar. 4, 1983

[51] Int. Cl.⁴ .............................................. B23K 26/00
[52] U.S. Cl. ...................... 219/121 LF; 219/121 LM; 346/76 L
[58] Field of Search ................. 219/121 LE, 121 LF, 219/121 LH, 121 LJ, 121 L, 121 LM, 121 EB, 121 EM; 346/76 L, 1, 135; 250/492.1; 29/576 T, 576 B

[56] References Cited

U.S. PATENT DOCUMENTS

| | | | |
|---|---|---|---|
| 3,663,793 | 5/1972 | Petro et al. | 219/121 LJ |
| 3,747,117 | 7/1973 | Fechter | 346/76 L |
| 4,307,408 | 12/1981 | Kiyohara et al. | 346/762 |
| 4,317,123 | 2/1982 | Namiki et al. | 346/76 R X |

*Primary Examiner*—C. L. Albritton
*Attorney, Agent, or Firm*—Robert J. Edwards; Kenneth W. Iles; D. Neil La Haye

[57] ABSTRACT

A marking system for providing a superficial metallurgically immaterial mark on zirconium, its alloys, and other metals is disclosed. The method includes producing a thin oxide layer on the surface of the metal, and locally heating a portion of the oxide layer to reduce it to the base metal and oxygen, which is driven into solid solution, thereby leaving a mark of contrasting color.

14 Claims, 3 Drawing Figures

METHOD FOR SUPERFICIAL MARKING OF ZIRCONIUM AND CERTAIN OTHER METALS

BACKGROUND OF THE INVENTION

1. Field of the Invention

The invention relates to a method for non-destructive temporary marking of zirconium, hafnium, and titanium.

2. The Prior Art

In manufacturing processes, it is often desirable to monitor the location and status of parts. To simplify such monitoring, parts are often marked in some manner. The prior art includes marking systems of three basic types, each of which may have advantages in a particular application. Marking systems requiring mechanical removal of material from the part or substantial disturbance of the material surface are well known. Such methods include engraving, stamping, scribing, and vibratory upsetting. In other applications burning or melting of a portion of the metal, which results in a discernable mark resulting from the altered surface texture, may be employed.

The foregoing methods frequently provide an adequate marking system. Each method provides a clearly discernable mark. Each method also, however, creates an altered metallurgical condition involving a dimensional change, which may be significant and adverse in some applications.

Alternatively, staining, painting or the like may be used to mark items. Use of stencils and painting, for example, provides an inexpensive, flexible, and thoroughly adequate marking system for many applications. Staining, painting, and the like however, contaminate the marked surface.

In some applications the dimensional change or contamination caused by one or more of the marking systems discussed above is unacceptable. For example, in some applications, during construction of military or other aircraft engines it is sometimes desirable to mark parts with identifying numbers and other information without disturbing the surface of the metal. Precision superficial marking without disturbing the metallurgical condition of the metal is also sometimes desirable in the nuclear energy industry. None of the marking systems described above meets these critical requirements.

Applications in the nuclear power industry, and in high performance aircraft, make extensive use of zirconium, alloys of zirconium, titanium, alloys of titanium; hafnium and alloys of hafnium.

Therefore, a need exists for a non-destructive superficial marking system that will not significantly disturb the surface or metallurgical characteristics of a metal workpiece comprising zirconium, titanium or hafnium.

SUMMARY OF THE INVENTION

An exemplary embodiment of the invention will be described in connection with the preferred embodiment involving a laser marking system. It is, however, to be understood that the invention may be expressed in a variety of physical embodiments. The present invention provides a method of marking a metallic element of the fourth group of elements in the periodic table comprising the sequential steps of oxidizing the surface of said metallic element and heating the surface of said anodized metallic element locally to produce a mark. In a preferred embodiment, an oxide layer is produced by anodizing and the local heating to produce a mark is produced by a laser. The method of the invention provides a superficial non-destructive method of marking zirconium, titanium, or hafnium, and alloys based on one or more of these foregoing metals and other metals. The method of the present invention relies on the ability of these three metals to absorb oxygen, and the constrasting color between the metal and its oxide.

Accordingly, it is an object of the present invention to provide a novel method for marking metals in the fourth family of the periodic chart, and alloys based on one or more of them.

It is another object of the present invention to provide such a marking method that does not significantly alter the metallurgical characteristics of the base metal.

It is a further object of the invention to provide such a marking system that in non-destructive and superficial.

It is another object of the present invention to provide such a marking system that provides a mark whose color contrasts with the color of the background surrounding it.

Other objects and many attendant advantages of the invention will become more apparent upon the reading of the following detailed description.

DETAILED DESCRIPTION OF THE INVENTION

Figure 1:
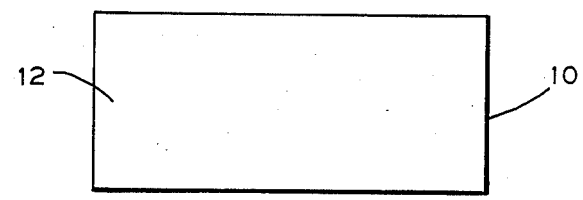
FIG. 1 illustrates a block drawing of the metal or metal alloy to be marked.

To practice the method, a metal 10 illustrated in FIG. 1 comprising zirconium, hafnium, or titanium is oxidized according to any known process. An especially useful technique for oxidizing the metal 10 is anodizing. Anodizing produces a very thin oxide coating 12 on the metal 10. The oxide coating 12 has a color that contrasts with the color of the metal 10. A full spectrum of colors can be achieved when anodizing zirconium by varying the voltage. Deep blue is especially useful because of its high contrast with the substantially white zirconium alloy. The oxide of zirconium produced by anodizing consists of $ZrO_2$.

When heated to a temperature of approximately 1300° F. (705° C.) zirconium oxide is reduced to zirconium and oxygen. In the case of other metals, similar chemical reactions take place. The metal previously bound in the oxygen retains its physical position and characteristics. This anodized oxide layer 12 is approximately $5 \times 10^{-6}$ inches thick. The oxide film 12 affects the surface characteristics of the metal 10, e.g., it alters electrical contact resistance of the metal 10. It can also be used as a protective coating on, e.g., zirconium clad nuclear reactor fuel rods. These surface effects have no adverse effect in most applications. When the oxide coating 12 is reduced by heating the oxygen is driven from the oxide coating 12, and goes into solid solution within the zirconium. This process of producing an oxide layer 12 then reducing the oxide and driving the oxygen into solid solution does not significantly alter dimensional characteristics of the metal 10.

Figure 2:
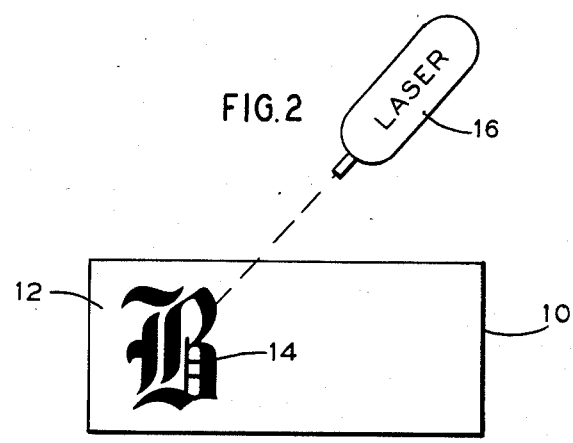
FIG. 2 illustrates the process by which the marking is made with the use of a laser.
Figure 3:
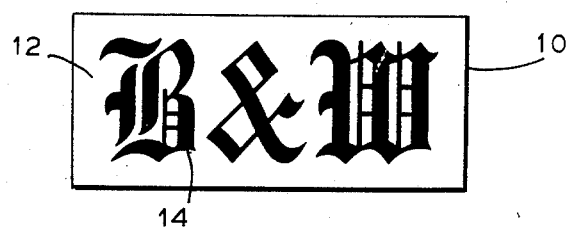
FIG. 3 illustrates the metal or metal alloy after the color contrast marking is completed.

Locally heating the oxide layer 12 results in a discernable mark 14 caused by the color contrast between the oxide coating 12 and the metal 10 as illustrated in FIG. 3. Any suitable means of local heating may be employed, such as an electron beam, X-ray beam, or a heated tip similar to a soldering iron and so forth. In a preferred embodiment, a laser 16 as illustrated in FIG. 2 provides the required heat. Using a laser 16, lines approximately ⅜ of an inch long and 0.010 inches wide were produced in a preliminary evaluation using Zircaloy-4 which had been anodically filmed. A laser of approximately 5 watts output was used in tests.

A variety of subsequent examination procedures disclosed no observable damage to the metal 10. Best results were obtained with a continuous output laser, which leaves a clearer mark than a pulsed laser. Pulsed lasers operating at frequencies of 3,000 and 10,000 hertz were also used. These caused some microscopic local melting resulting in a scalloped mark.

Marked specimens were subjected to visual examination, optical microscopic examination, and scanning electron microscopy. Each of these tests indicated no significant damage to or alteration in the metallurgical structure of the specimen. The demarcation line between the annealed edge and the anodic film is readily observed by scanning electron microscopy. Removal of the oxide film does not visibly alter the grain structure of the metal as seen by the scanning electron microscope.

Samples of marked zircaloy-4 were subjected to corrosion testing following marking. The corrosion testing comprised vacuum annealing the sample for four hours at 1,200° F. Sample was then pickled in 35% $HNO_3$, 3% HF to remove 0.002 inches per surface. The test sample was then rinsed in 180° F. deionized water and subsequently corrosion tested in hot water for three days at 680° F. Visual examination after testing showed both the area of the laser line and the previously anodized area to have acceptable black lusterous oxide film. The original mark could be detected after corrosion testing only with great difficulty. It is believed that the marked area may have originally pickled faster because of less oxide presence. This test shows that the process according to the present invention has no adverse effect on subsequent corrosion of the metal in a typical corrosive environment.

To test for the possibility that the process of the present invention may sensitize the metal to abnormal grain growth, a specimen was subjected to three annealing cyles of four hours at 1,200° F. and then metallographically evaluated. No microstructural difference could be detected between the area of the mark and the surrounding metal.

Finally, transverse sections of the samples were examined. Three transverse sections were further tested under electron microscopy. The three samples were (1) the sample as marked; (2) as corrosion tested; and (3) as annealed for blocky alpha study. In each case, no difference in microstructure could be detected between the material adjacent to the line and the base metal. No dimensional evidence of the markings could be detected.

Any desired marking may be made according to the present invention. The ease of marking straight lines according to the present invention suggests that machine readable bar codes such as those found on grocery store food items would present a useful marking system. In any application it may be useful to control the movment and off-on state of the laser with a computer. Normal human readable characters such as letters and numerals could also provide useful marking according to the present invention. In fact, any communicating mark may be used.

Such marks will only be temporary if the workpiece is ultimately exposed to high temperatures because high temperatures will reoxidize the marks. The marking system of the present invention is, therefore, most useful in applications where the workpiece is not exposed to high temperatures or corrosive environments, or to applications where the workpiece must be monitored only during the manufacturing process.

Although the invention has been described with respect to a preferred embodiment, variations will occur to those skilled in the art. For example, an oxide film was used in the preferred embodiment. An equivalent solid state reaction could be used on a surface hydride, nitride, or carbide, as long as the oxide and the base metal contrast in color. Further, in the preferred embodiment described above, the contrasting appearance between the metal and its oxide is in the visible spectrum. A similar contrasting appearance between the oxide and the substrate could also be found in different portions of the spectrum, such as infrared, ultraviolet, or X-ray fluorescents. Therefore, it is intended that the invention not be limited to the specific embodiment illustrated but should be interpreted according to the claims that follow.

I claim:

1. A nondestructive method of marking a metallic element of group 4b of elements in the periodic table comprising the sequential steps of:
   oxidizing the surface of said metallic element to produce an oxide layer of a color that contrasts with the color of said metallic element; and
   heating selected areas of the oxidized surface of said element locally to produce a contrasting mark by reduction of said heated selected areas of oxide layer to said metallic element.

2. The method of claim 1 wherein said metallic element is zirconium.

3. The method of claim 1 wherein the step of heating is carried out by a laser.

4. The method of claim 3 wherein said laser is computer controlled.

5. The method of claim 1 wherein said oxidizing step further comprises anodizing.

6. The method of claim 1 wherein said heating step is carried out at a temperature of approximately 1300° F.

7. A nondestructive method of marking a metallic alloy of a metallic element of group 4b of elements in the periodic table comprising the sequential steps of:
   oxidizing the surface of said metallic alloy to produce an oxide layer thereon of a color that contrasts with the color of said metallic alloy and heating selected areas of the surface of said oxidized metallic alloy locally to produce a contrasting mark by reduction of said heated selected areas of oxide layer to said metallic element.

8. The method of claim 7 wherein said metallic alloy comprises zirconium.

9. The method of claim 7 wherein said metallic alloy comprises zircaloy-4.

10. The method of claim 7 wherein the step of heating is carried out by a laser.

11. The method of claim 7 wherein said laser is computer controlled.

12. The method of claim 7 wherein said oxidizing step further comprises anodizing.

13. The method of claim 7 wherein said heating step is carried out at a temperature of approximately 1300° F.

14. A nondestructive method for temporarily marking a metallic alloy selected from the group consisting of titanium, zirconium, and hafnium based alloys, comprising:

a. first anodizing said alloy to produce an oxidized surface layer of a color in contrast to the color of said alloy; and b. secondly locally heating selected areas of said oxidized layer at a temperature of approximately 705° C., causing reduction of said selected areas to said metallic alloy whereby a contrasting mark is produced.

* * * * *